H. W. Catlin,
Wash-Stand.
N°. 107,661.     Patented Sep. 27, 1870.

Witnesses:
Chas. A. Catlin
Robt. M. Catlin

Inventor:
Henry W. Catlin

United States Patent Office.

HENRY W. CATLIN, OF BURLINGTON, VERMONT.

Letters Patent No. 107,661, dated September 27, 1870; antedated September 15, 1870.

IMPROVEMENT IN WASH-STANDS AND TANKS.

The Schedule referred to in these Letters Patent and making part of the same.

*To all whom it may concern:*

Be it known that I, HENRY W. CATLIN, of the city of Burlington, in the county of Chittenden and State of Vermont, have invented a new and useful Improvement in Wash-Stands, Water-Tanks, &c., to be used on wash-stands, tables, counters, and similar places; and I do hereby declare the following to be a full, clear, and exact description of the same, reference being had to the accompanying drawings making a part of this specification.

Similar letters indicate like parts.

Figure 1:
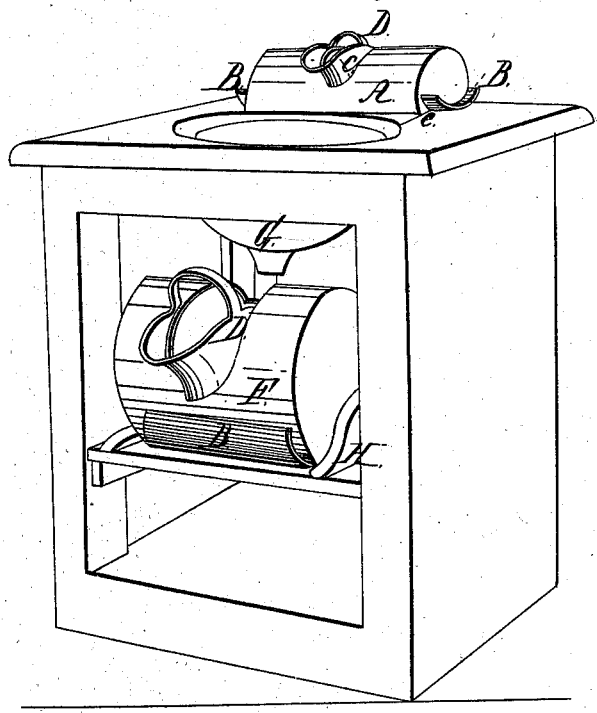
Figure 1 represents a view of a wash-stand with the tanks placed, the upper tank having the rockers on the end, the lower tank having the rocker on the bottom.
Figure 2:
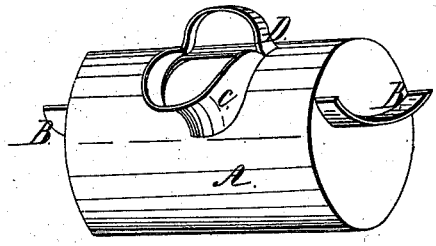
Figure 2 represents the upper tank detached.

This invention relates to a new and useful improvement in rotary tanks.

The object of this invention is to provide a device for using water on wash-stands, tables, counters, and similar places, without moving the tanks, bowls, or pitchers from the stand, thus avoiding the risk of breaking the ware, slopping of water, and rendering its use much more easy and convenient.

To enable those skilled in the art to fully understand and construct my invention, I will proceed to describe it.

A represents a tank.
B represents the curved rockers.
C represents a spout.
D represents the handle.
E represents the bed or way for the rockers.

F represents the slop-tank with the rocker on the bottom B.

H, guides.

From the foregoing description it will be seen that but little strength is required to turn the tank on the points on which it moves or turns. The tank being turned forward by the handle D, the water is discharged into the bowl, then into the lower tank, which being turned forward, will discharge into the slop-pail for removal.

When the tank A is turned forward by the handle D, the points on which it turns move forward, thus elevating the lower part of the tank faster than the spout moves downward, and discharging the contents before it has turned one-quarter of the distance round.

The rockers, or the bed on which the rockers move, may be curved to give the tank any desired movement. When the handle is let go, the tank returns to its place, the rockers and bed affording it a safe and easy movement.

Having thus described my invention,

What I claim as my improvement in wash-stands and water-tanks, &c., is—

In the construction of the stand with its adjustable shelf with guides H, in combination with the water-tank or receptacle C A, its circular support B, handle D, basin G, and slop-receptacle F, all arranged as shown and described.

HENRY W. CATLIN.

Witnesses:
T. E. WALES,
CHAS. A. CATLIN.